Nov. 22, 1966    C. C. KLING    3,287,503
AUDIO INSTRUCTION EDITING SYSTEM
Filed Dec. 31, 1962    2 Sheets-Sheet 1

MOVABLE HEAD SYSTEM

DRUM SYSTEM

OPERATION

FORWARD PASS 1 ←    MIMIC

REWIND PASS 1 →    EDIT

FORWARD PASS 2 ←    MIMIC

REWIND PASS 2 →    EDIT

INVENTOR
Carl C. Kling

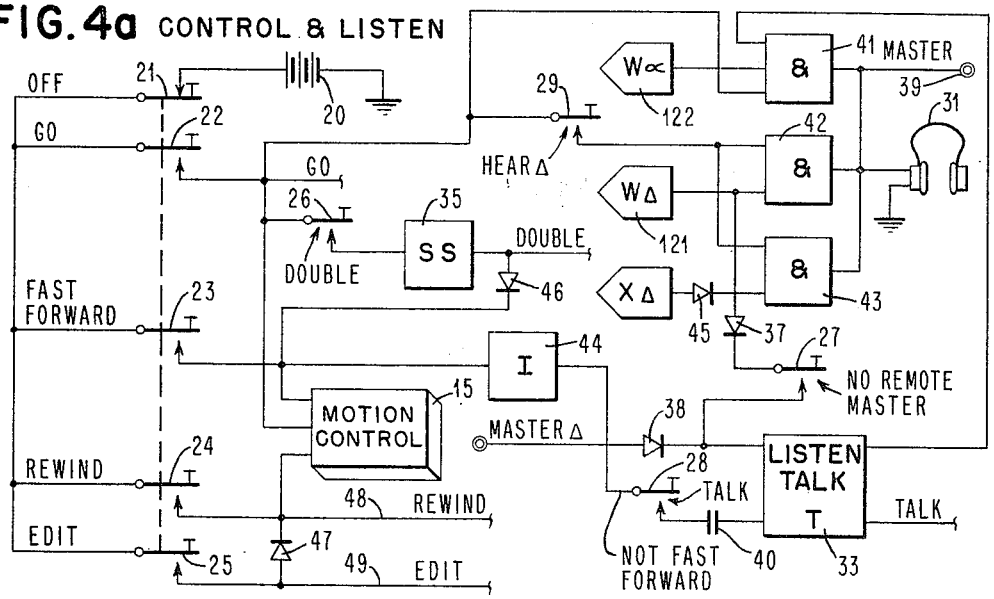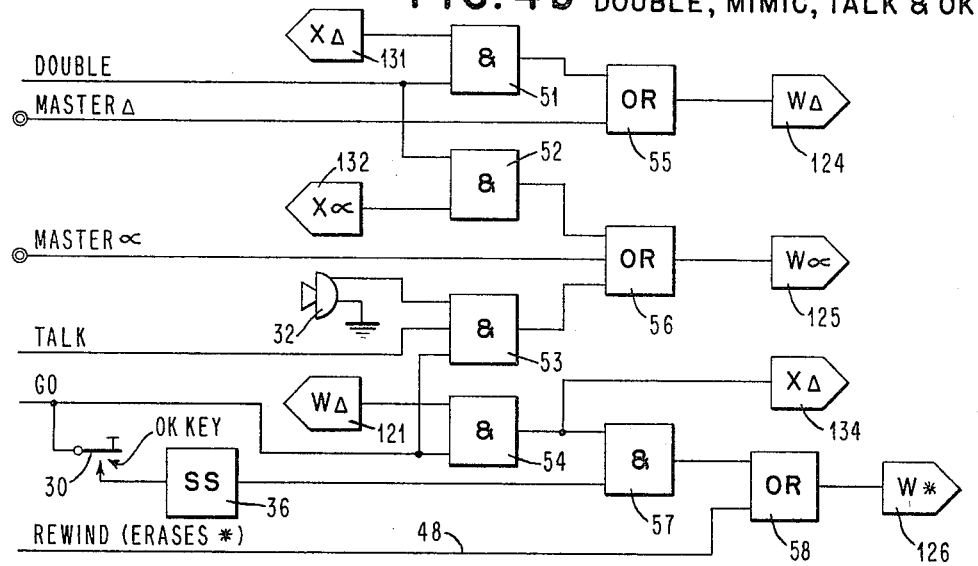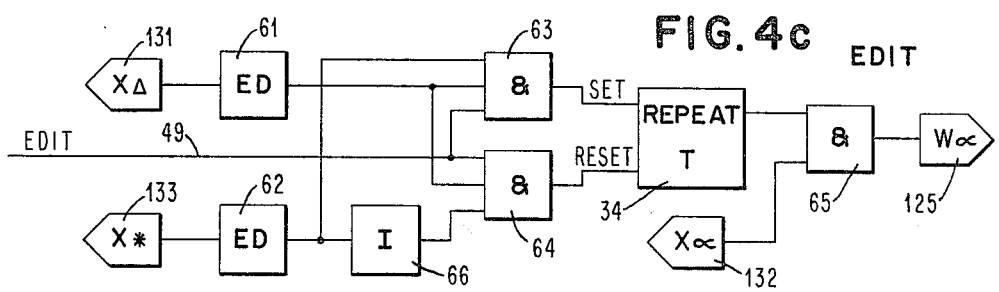

United States Patent Office 3,287,503
Patented Nov. 22, 1966

3,287,503
AUDIO INSTRUCTION EDITING SYSTEM
Carl C. Kling, Poughkeepsie, N.Y., assignor to International Business Machines Corporation, New York, N.Y., a corporation of New York
Filed Dec. 31, 1962, Ser. No. 248,351
16 Claims. (Cl. 179—100.2)

This invention relates to a system for editing educational phrases recorded on tape, and more particularly relates to a system for editing selective phrases of a series of phrases according to the desires of the listener.

The listener, during a first forward pass of the tape, selects the presentation mode for each phrase by operating simple keys. A certain amount of editing occurs instantaneously upon operation of the keys; editing marks are placed upon the tape to control the rest of the editing operation. During rewind, the tape editing is completed under control of the editing marks on the tape. The basic capability of the editing operation is control over the number of presentations of each phrase—the phrase may be presented zero, one, two or possibly more times on the next forward pass depending upon the presentation mode.

Environment of invention

In language learning situations, it is common for a master voice or master tape to pronounce a phrase in the new language and immediately allow time for the student to make a mimic response. In order to allow sufficient repetition of difficult phrases for average students, the gifted student is sometimes subjected to time-wasting multiple presentation of learned phrases. The poor student may not get enough repetition. The need has existed for a system of tape recording which will allow the student to control the presentation of phrases according to his own talents and needs. No satisfactory system of editing tape presentation, however, has previously been available.

Flash cards are a basic vocabulary learning tool in language study. With a deck of flash cards, the student can pace himself in his learning, and, by discarding learned items, keep the presentation fresh and stimulating. Flash cards, however, are graphic in nature and not aural. Where difficult sounds are involved, it is almost impossible to explain such sounds graphically; mimic response immediately following a correctly stated phrase is much more likely to result in proper pronunciation, stress and pacing. For example, it is virtually impossible to explain graphically the exact trilling of the R, which does not exist in the usual American pronunciation but is common in most other Indo-European derivations in varying degrees. In Russian, for example, it is common to trill the R only two or three taps, while in Spanish the trilling of the R varies from one tap to a seemingly endless roll, depending upon emphasis.

Aural-graphic flash cards have been proposed. Such flash cards show the printed phrase and include a permanently recorded aural presentation of the phrase. The very nature of such a system, however, requires expensive manufacturing techniques for the vast number of cards desired, since each is different, and requires a careful handling of the card. A special reader for the cards is also required.

The magnetic tape recorder, however, has shown itself to be the mechanism best suited to language study, because of its inherent low cost per unit of information presentation, and because unskilled persons can be simply taught to operate the machine properly. A library of master tapes can be made available to the student.

Tape presentation, however, normally must follow a fixed format of serial presentation. A library of graded-difficulty master tapes may be maintained, so that the gifted learner may seek enrichment in other fields. But even the gifted learner may have pronunciation difficulty at unexpected times. This is especially true where the learner is already familiar with a language having very similar sounds; it is sometimes more difficult for the human to train the vocal apparatus to make slight variations in familiar sounds than to learn a completely new sound. The most effective way to learn the new sound or variation is to mimic the sound repetitively during a period long enough for the ear and the vocal mechanism to learn the fine distinctions. This type of repetition is not easily available to the average language student—it requires a patient tutor.

The magnetic tape recorder can serve as an infinitely patient tutor. It can present the same phrase over and over thousands of times, without fatigue, but only if it has been recorded previously with the thousands of repetitions of the difficult phrase.

The student is normally a very good judge of his ability to command a phrase. He can without difficulty provide an immediate indication of his desire with respect to each phrase, in a tape situation as well as in flash card situation. He may desire one of the following presentation modes, with respect to a particular phrase:

(1) Provide a maximum number of repetitions of the phrase on the next mimic pass, with a minimum of two; the phrase is too difficult even to try the mimic after a single hearing.

(2) Provide a number of repetitions of the phrase on the next mimic pass; the mimic is unsatisfactory or the student lacks assurance.

(3) Exclude the phrase from all future mimic passes; the phrase is a part of the student's repertoire.

Characteristics of the invention

OBJECTS

The object of the invention is to edit a serial presentation of units of information during a first tape pass and rewind, so that the presentation on the next pass contains repetitions of some units of information and excludes selected units of information.

A more specific object of the invention is to edit a series of phrases recorded serially by replacing, during an edit rewind pass, those phrases selected for replacement during the previous forward pass, the replacement being with a duplication of an adjacent unselected phrase.

Another object is to facilitate the learning of phrases by providing the student, during a first pass of a serial recording during which he mimics the presentation of phrases by a master, with selectivity control over phrase presentation, so that on rewind the phrases selected by the student as learned are excluded from presentation while the phrases unselected by the student as unlearned are repetitively presented insofar as duplications of the unlearned phrases replace the learned phrases.

Another object of the invention is to facilitate the learning of phrases by providing the student, during a first pass of a serial recording during which he normally mimics the presentation of phrases by a master, with capability to use the time normally allowed for his mimic response of a hard phrase to repetitively record the master phrase, so that on future mimic passes the hard phrase is presented repetitively.

Another object is to speed the study of language by providing a safeguard against encroachment by the student response upon the following master phrase, which safeguard allows the phrase interval to be set at minimum duration for effective operation.

SUMMARY

The invention relates to a tape editing system especially useful in the learning of languages. The basic function of the system is to present to the student a series of correctly pronounced master phrases in the new language, leaving after each master phrase sufficient time for the student to make a mimic response. The function of the editing capability is to allow the student to select learned phrases in such fashion that these phrases are removed from the tape during an edit rewind pass and replaced by a duplication of the next adjacent unlearned phrase. The student can then make another mimic pass and again select learned items for replacement during the edit rewind. After a suitable number of passes, the tape contains only a series of multiple repetitions of very difficult phrases which the student can grind through until he has reached satisfactory proficiency.

The tape has two read-write stations, W and X, and has three channels marked "delta," "alpha" and "asterisk." The alpha channel is the voice channel. The delta channel contains markers indicating the phrase interval. The asterisk channel is marked at the start of the following phrase interval by the student to select the phrases which have been satisfactorily learned. During an edit rewind pass, a selected phrase is in position at head W when its next following word is in position at head X. Control circuitry responsive to the control tracks determines the desirability of replacing the selected word and establishes circuits at head X to read the next following unlearned phrase (currently in reading position under head X) and write such phrase at head W. If the previous word was also selected during the mimic pass (note that this is a rewind pass) the phrase just recorded at head W is now in position at head X for a similar treatment. The unselected word will in turn replace a whole series of learned words as the edit rewind continues. Any further unselected phrase will of course not be replaced at head W, and will as it passes under head X be in position to replace the phrase passing under head W, should such phrase have been selected during the mimic pass.

FEATURES

A feature of the invention is the provision of three tracks on the tape so that two control tracks are available in addition to the data track. One control track defines phrase intervals; the other control track is the selectivity control and is under the direct control of the student. By manipulating the selectivity control, the student can provide selective editing of the tape.

Another feature is the provision of two read-write stations, so that there is capability of repetitive recording on a single tape. A phrase being read at one station is simultaneously capable of being written at the other; as soon as this is complete, the repetition of the phrase is in position for reading, so that the operation continues.

Another feature of the invention is the provision of a single read-write station together with a magnetic drum driven synchronously with the tape. The magnetic drum provides temporary storage of a phrase so that a phrase may be repetitively recorded on the tape from the drum, and the drum can be recorded from the tape.

A feature of the invention is the "double" feature mechanism, which allows the student to forego his mimic response to a particularly hard master phrase in favor of a repetitive presentation on the next mimic pass. The double feature provides for a temporary fast forward drive of the tape and a feedback arrangement so that the repetition of the hard phrase is taken directly from the first recording on the tape.

A feature of the invention is the "edit" feature mechanism, which allows the student to select certain learned phrases, during the mimic pass, by recording an asterisk in the selectivity control track, and, on the rewind pass, replace the asterisk-selected learned phrases at one read-write station with the next adjacent unlearned phrase which is contemporaneously at the other read-write station.

ADVANTAGES

Tape editing allows the student to use his time fully in the study of unlearned material. The ennui which might result from the presentation of learned material and the resulting lack of interest are removed; the student can spend his learning time on fresh material and save time for other pursuits.

The foregoing and other objects, features and advantages of the invention will be apparent from the following more particular description of preferred embodiments of the invention, as illustrated in the accompanying drawings.

Figure 3:
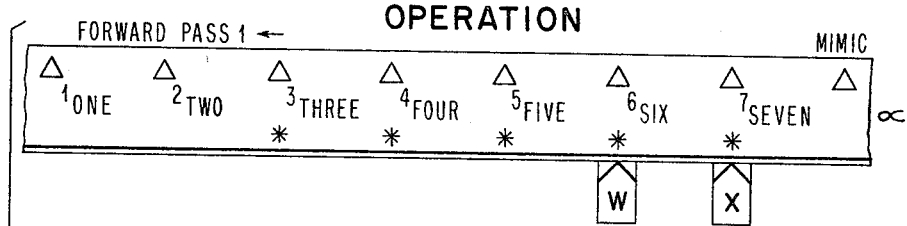
Figure 3:
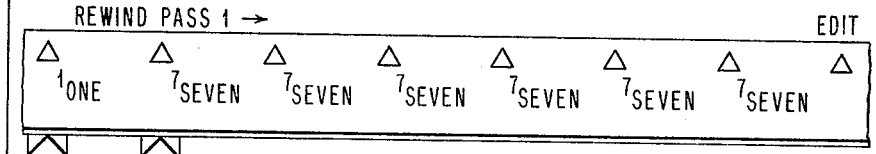
Figure 3:
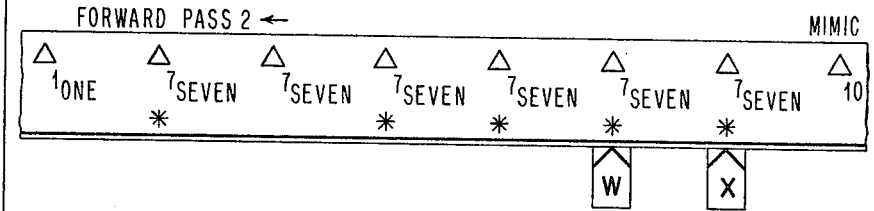
Figure 3:
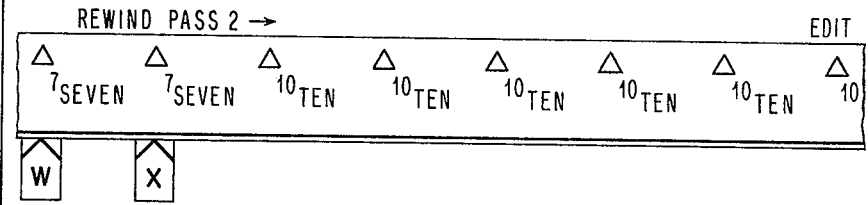

FIGURE 3 diagrams the operation of the invention. The results of two sample mimic (forward) passes and two edit (rewind) passes are shown.

FIGURES 4a, 4b and 4c comprise a schematic electrical diagram of the circuits making up the invention. FIGURE 4a illustrates the "control" and "listen" circuits; FIGURE 4b shows the "double," "mimic," "talk" and "OK" circuits; FIGURE 4c illustrates the "edit" circuits.

Method

The edit method follows these steps, with respect to a tape which has previously been marked during a forward (mimic) pass:

(1) Passing the tape in reverse over a read-write station, to position in turn at such station each phrase both selected and unselected;

(2) Maintaining a capability to read the next adjacent unselected phrase;

(3) Detecting the selected nature of a phrase; and (4) Replacing the selected phrase with the next adjacent unselected phrase.

The mimic method, with respect to a phrase learning situation in which first a master presentation is made, followed by a student mimic response, follows these steps:

(1) Passing the tape forward over a read-write station to position at such station each phrase in turn, each phrase being marked with a phrase marking signal;

(2) Setting a listen-talk trigger to listen upon receipt of the phrase marking signal, which requires the student to listen to the master; and (3) Setting the listen-talk trigger to talk by the operation of a talk key, such setting being momentary upon operation of the key, so that receipt of the phrase marker marking the start of the next phrase interval sets the listen-talk trigger to listen, regardless of whether or not the student is still depressing the talk key.

The double method, with respect to a phrase learning situation in which first a master presentation is made, followed by a student mimic response, follows these steps:

(1) Passing a tape forward over a read-write station to position at such station each phrase in turn, each phrase being marked with a phrase marking signal;

(2) Maintaining a capability to reread the previously recorded phrase, by mechanism synchronized with tape movement;

(3) Temporarily accelerating the tape and reread capability mechanism; and (4) Writing the phrase a second time on the tape during the temporary acceleration by taking it from the reread capability.

Figure 1:
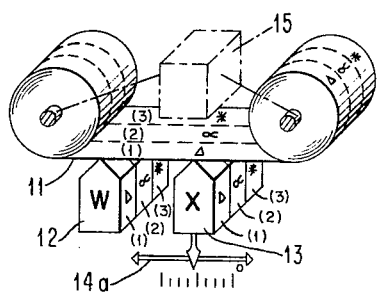
FIGURE 1 is a diagram of a first type of tape system which has two spaced read-write stations.
Figure 2:
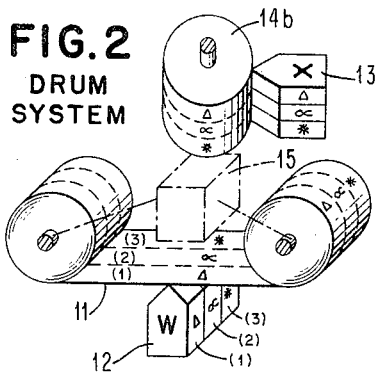
FIGURE 2 is a diagram of a second type of tape system which has a tape read-write station and a synchronized drum with its own read-write station.

System—FIGURES 1 and 2

The basic system is a three track magnetic tape recording mechanism having a first read-write head W for basic tape operations and a second read-write head X for special operations according to this invention. The time delay between recording at first head W and at second head X effectively defines a phrase interval.

FIGURE 1 illustrates an embodiment having two heads, one of which is movable. Tape 11 is driven past W head 12 and X head 13 according to standard tape driving techniques. X head 13 is movable in both directions along the tape path by mechanism 14a which might characteristically include a locking slide track and a scale so that the operator can pre-position X head 13 according to the scale, make whatever vernier adjustments are necessary and then lock the head in position. As tape 11 passes from right to left in FIGURE 1, W head 12 comes into position to mark and write a phrase just as X head 13 comes into position to mark the beginning of the next phrase. Space between W and X defines a length of tape which passes a given point during a phrase interval. Motion control box 15 provides the necessary mechanical direction, drive and speed controls according to well known techniques of tape recording. FIGURE 2 illustrates a variation of the tape system which includes, rather than just a second tape reading head, a magnetic drum driven similarly to the tape. The function of the magnetic drum is to provide temporary storage for one phrase interval so that its X reading head 13 in FIGURE 1 functions. Magnetic tape 11 is driven past tape read-write W head 13 during normal operation. X 13 reads magnetic drum 14b which is driven in such fashion that it makes one revolution during a phrase interval. The surface speed of the drum and the surface speed of tape 11 may be varied relative to one another but the phrase interval is always one revolution of magnetic drum 14b. One suitable method of varying the drum speed is by a conical pulley on the drive shaft (not shown).

The function of magnetic drum 14b is to provide delay of one phrase interval by storing the image of the signals recorded by the W head, storing these signals during the time necessary to revolve, and providing this image upon demand. An amplified wire connection from the read side of read-write head W13 to the write side of read-write head X14 is the preferred way to provide the drum with this image. Various other schemes, such as using a larger drum with spaced W-related and X-related read-write heads is also a possibility, so long as X head 13 is capable of reading the image (one delay period later) of the signals transduced at W head 12. X head 13 must also be connected for providing its signals to W head 12 write circuits to accomplish the editing functions of the invention.

Operation example—FIGURE 3

The example shown illustrates the method of learning to pronounce numbers. Magnetic recording on the tape is shown graphically. Seven phrase intervals are shown as outlined by eight delta markings in the delta track. The delta marking the beginning of each phrase interval also marks the end of the previous phrase interval. In the first delta interval the master presentation is "one" as shown by the digit 1. The student response is "one" as shown by the spelled out word one. The student, not satisfied with his response, refrains from marking the phrase OK with the asterisk.

The second phrase interval has a master presentation of 2 followed by the student response "two" and an asterisk. The asterisk indicates that the student is satisfied with his response and wishes the prase omitted from the tape on any further mimic pass. Note that the asterisk for the second phrase interval appears coincident to the delta marking the beginning of the third phrase interval. The third phrase interval includes a master presentation of 3, a student response of "three" and an asterisk marking the student's satisfaction with his response.

The fourth phrase interval is a similar master presentation, student response and OK asterisk are as the fifth and sixth intervals.

The seventh phrase interval begins with the delta coincident to the OK asterisk for the sixth phrase interval and includes a master presentation of the phrase 7 followed by a student response "seven." The student, not satisfied with his response, refrains from marking the OK asterisk with the knowledge that he will have presented one to several chances to mimic the 7 on further mimic passes.

At the end of the tape the student makes an edit rewind. During this edit rewind the tape runs backward and OK phrases are replaced by unlearned phrases so that the tape will on future mimic passes present fresh unlearned matter. On the first mimic pass, the student, satisfied with his ability to handle digits 2, 3, 4, 5 and 6, marked them OK. He is not satisfied with his response to phrase 1 and 7. After the edit pass, the tape no longer contains any references to phrases 2–6, these phrases being replaced during the edit rewind pass by the next adjacent unlearned phrase 7. During the rewind pass the asterisks are detected and a repeat mechanism is triggered; the asterisks are then erased. The repeat mechanism causes the OK phrase which is currently passing (backwards) over the W head to be replaced by the phrase currently passing over the X head. The original 7 at right thus is read at the X head and written at the W head. Immediately afterwards the just-recorded 7 (currently passing the X head) is used to write at the W head. At the end of edit rewind pass 1 the tape master presentations have been narrowed down to one 1 and six 7's. On mimic pass 2 the student is satisfied with his response to the 1. He marks the asterisk to indicate that his "one" response is OK realizing that on any further mimic pass the 1 will be omitted. The student again has trouble with phrase 7 on its first presentation. He refrains from marking the OK. On the second and subsequent presentations of the 7, the student is satisfied with his response and marks the OK asterisk.

Apparently the student has no trouble with phrase 8 and 9. Peeping in at right in the forward pass 2 tape is 10. Since the five rightmost appearances of phrase 7 are marked OK with the asterisk, the unlearned 10 replaces them.

A phrase may of course be only one word rather than several. It could possibly also be a series of numbers, such as multiplication tables. It might be a musical passage or any simple item of knowledge subject to unitary handling in the fashion described for language learning.

Circuits—FIGURE 4

Battery 20 provides basic power. The basic control is by mechanically interlocked switches 21–25 and separate switch keys 26–29. Triggers 33 and 34 and single shots 35 and 36 provide electronic storage where needed. Earphones 31 and microphone 32 are the basic transducers from oral signals (spoken words) to electrical signals. The W head (12 in FIGURE 1) is in three sections electrically. W delta is 121; W alpha is 122; and W asterisk is 123. Similarly the X head is in three sections. X delta is 131; Xalpha is 132 and X asterisk is 133. The write heads similarly are as follows: W delta 124; W alpha 125; W asterisk 126; X delta 134; X alpha 135; X asterisk 136.

FIGURE 4a—CONTROL AND LISTEN

Macro-control is by interlocked switches 21–25. When one switch is operated, all other switches are unoperated. Off switch 21 is normally closed. Pressing any of the other switches 22–25 will place Off switch 21 in the unoperated or normally closed position and provide power from battery 20 to all of the other switches. The first switch function during normal operation is operation of Go switch 22 which provides at the adjacent terminal the signal GO and also provides power to the primary side of Hear Delta switch 29. By operating Hear Delta switch 29 the operator can hear audio signals corresponding to the phrase markers and thus line up the X head at the proper phrase interval distance from the W head. W delta head 121 and signal HEAR DELTA at AND circuit 42 provides a direct path for the W delta signal to earphones 31. At the same time X delta head 131 provides a signal via diode 45 coincident to HEAR DELTA, via AND circuit 43 to earphones 31. Diode 45 changes the frequency of the X delta signal so that the listener can distinguish between the X delta and W delta which normally are very similar signals, such as 5000 cycle sine waves. The operator is able to move the X head or adjust the speed of the magnetic drum so that the phrase interval corresponds to that previously recorded on the tape. If there is no phrase interval previously recorded on the tape, the operator may simply adjust the phrase interval according to a scale and proceed without bothering to listen to the deltas. A direct connection from MASTER plug 39 allows the student to hear whatever the master desires, including delta if so provided.

During the existence of the GO signal, W alpha head 122 together with the GO signal and the LISTEN signal output of listen-talk trigger 33 provide a path for the voice channel via AND circuit 41 to earphones 31. The operator normally hears the voice channel except when talking.

DOUBLE

During a normal mimic pass the student may hear a master phrase which he realizes is too difficult even to attempt to mimic. He may desire to have this difficult phrase presented more than once on further mimic passes so that he can have extra chances to learn it. He presses Double key 26 which sets off single shot 35 and thus provides a DOUBLE signal of standard duration for the depression of Double key 26. This DOUBLE signal passes through diode 46 to motion control box 15 and temporarily speeds up the tape. The double signal also appears to certain other portions of the circuitry as a FAST FORWARD signal, due to its connection to the secondary of Fast Forward switch 23.

FAST FORWARD

The fast forward feature according to the invention is no different from any other fast forward and is simply a mechanism for allowing the student to find a particular place on the tape at maximum speed. Fast Forward switch 23 causes all other switches to be unoperated, and provides a FAST FORWARD signal. The FAST FORWARD signal passes to motion control box 15, and also conditions inverter block 44 to stop providing its normal output of NOT FAST FORWARD. Since the NOT FAST FORWARD signal is a prerequisite to setting Listen-Talk trigger 33 to talk there can be no recording via the microphone 32 during the fast forward period.

REWIND

Rewind switch 24 disengages all the other switches on the interlock and provides on line 48 the signal REWIND. The REWIND signal passes to motion control box 15 which controls a rewind operation standard to most tape recording systems.

EDIT

Edit switch 25 disengages other switches and provides on line 49 the signal EDIT. The EDIT signal also passes via diode 47 to Rewind line 48 and thus to motion control box 15 where it causes a rewind-type operation.

DOUBLE MIMIC, TALK AND OK

*Double.*—Signal DOUBLE (the output of single shot 35 in FIG. 4a) controls AND blocks 51 and 52 to pass the signals read respectively at X delta head 131 and X alpha head 132. AND block 51 thus provides via OR block 55 the delta signal to reproduce the delta for the second and any subsequent repetition of the phrase which was made during the double interval. OR block 55 at double time or a master delta signal, if available, provides signal to W delta head 124 and in this fashion marks the beginning of each phrase interval with the delta signal. During double time X alpha head 132 via AND block 52 and OR block 56 connects to W alpha head 125 and thus records at the W head the phrase just passing the X head.

*Master.*—When jackplugged into a master system the master phrase marking delta signal passes via OR block 55 to W delta head 124.

During the GO operation the delta signal from W delta head 121 passes via AND circuit 54 to X delta right head 134 to place a delta signal at both the beginning of the next phrase interval on tape.

*OK Key.*—During the Go operation the OK key 30 primary is supplied wtih a continuous D.C. signal. The student, if he is satisfied with his learning of a particular phrase, presses OK key 30 momentarily. This operates single shot 36 which provides a continuous D.C. signal during a period selected to be long enough to extend to the next delta marker. The delta signal read by W delta read head 121 thus passes through AND circuit 54, AND circuit 57 and OR circuit 58 to the W asterisk write head 126. A single depression of the OK key during the latter part of any phrase interval thus operates to record the asterisk in the asterisk channel in exact synchronism with the delta in the corresponding delta channel. This asterisk is at the end of a phrase interval during a mimic pass and during the following edit rewind is at the beginning of the phrase interval for an accompanying phrase. The asterisk signal on tape is virtually identical to the delta.

A REWIND signal on line 48 erases the asterisk at the W asterisk head 126 during all rewind passes including the edit rewind pass. No contingency where it is desirable to retain the asterisk markings is known. If however it should be desirable to rewind and retain the asterisks, a normally closed switch in line 48 would have that effect.

*Edit.*—The edit circuit functions only during the edit rewind. Edit switch 25 in FIGURE 4a provides the edit signal on line 49 which controls the entire operation of the circuit. The X delta signal and X asterisk signal appearing respectively on X delta read head 131 and X asterisk read head 133 provide signals via AND circuit 63 and 64 to operate Repeat trigger 34. Repeat trigger 34 is set upon coincidence of the X delta and X asterisk signals during the edit pass; Repeat trigger 34 is reset upon an appearance of the X delta signal without an accompanying X asterisk signal during an edit pass. Setting of Repeat trigger 34 conditions AND circuit 65 to pass the signal currently being read at X alpha read head 132 to W alpha write head 125. Since the X delta and X asterisk signals are alternating current signals, envelope detectors 61 and 62 are placed in a circuit to convert their outputs to positive voltage direct current signals. Inverter 66 provides the complement of the X asterisk signal. AND block 63 thus responds to the D.C. X delta signal, the D.C. X asterisk signal and the edit signal while AND block 64 responds to the edit signal, the X delta D.C. signal and the complement of the X asterisk D.C. signal. The Repeat trigger stays up during the entire phrase interval and is either reset or allowed to remain set depending upon the student's selection of the previous phrase during the preceding mimic pass.

Components and subassemblies

The basic magnetic tape drive, control, recording and playback mechanisms follow established forms currently on the market in various monaural, stereo, video and computer applications. Since the major application is voice recording, the requirements of fidelity are not stringent, so long as the requisite channels are distinguishable. It might be possible, for example, to combine the delta and asterisk channels and distinguish these signals electronically.

The electronic circuits may be simple diode-logic AND and OR circuits, the transistor inverters. Triggers may be set-reset triggers of various types.

Single-shots may be of several types, including that described in:

Belcastro, "Single Shot Multivibrator," IBM Technical Disclosure Bulletin, volume 3, No. 3, August 1960, pages 39–41. Adjustability of single shot duration is advantageous if there is to be a wide range of phrase interval lengths.

Envelope detectors may be of several types, including that described in:

U.S. Patent 3,002,154, issued 26 September 1961, Schmits et al., Pulse Amplitude Detection System, class 329–109.

*Summary*

This invention relates to a system for editing educational phrase tapes by removing selected phrases, filling the spaces with multiple presentations of adjacent unselected phrases.

The system has two read-write stations, W12 and X13, a voice channel (alpha), a channel containing phrase interval markers (delta) and a selection marker channel (asterisk). During a first forward tape pass, the student hears and then mimics each master phrase and selects learned phrases for removal by marking the asterisk channel. Later, during an edit rewind pass, a selected phrase is in position at head W when its next following word is in position at head X. Control circuitry responsive to the delta and asterisk marker channels identifies the selected phrase. This control reads the next following unlearned phrase (currently in reading position under head X) and writes such phrase at head W. If the previous word was also selected (note that this is a rewind pass) the phrase just recorded at head W comes into position at head X, and the unselected phrase may replace a whole series of unselected phrases.

INDEX TO CLAIMS

1—The phrase editing system.
2—Claim 1 and mimic mechanism.
3—Claim 1 and listen mechanism.
4—Claim 1 and double mechanism.
5—Claim 1 and OK mechanism.
6—Claim 1 and edit mechanism.
7—Detailed system.
8—Claim 7 and two heads as shown in FIGURE 1.
9—Claim 7 and the drum as shown in FIGURE 2.
10—The mimic feature.
11—The listen feature.
12—The double feature.
13—The edit features.
14—The mimic method.
15—The double method.
16—The edit method.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A phrase editing system comprising:
   (a) means to record on the tape during a mimic pass a series of phrases;
   (b) means to record on the tape during the same mimic pass a selection marker (asterisk) associated with selected ones of said series of phrases; and
   (c) means responsive to the selection marker to replace each selected phrase with the next adjacent unselected phrase.

2. A phrase editing system according to claim 1, wherein said means (a) to record on the tape during a mimic pass a series of phrases includes means to record at the commencement of a phrase a phrase marker; a "listen-talk" trigger settable to the listen state by said phrase marker; and "talk" switch means to reset the listen-talk trigger to the talk state upon operation subsequent to the commencement of a phrase.

3. A phrase editing system according to claim 1 further comprising:
   (d) means to provide audio outputs corresponding to the phrases recorded on the tape;
   (e) first reading means to provide audio outputs corresponding to phrase markers recorded on the tape;
   (f) second reading means to provide audio outputs corresponding to phrase markers recorded on the tape, the audio outputs being distinguishable as coming from said first reading means or said second reading means; and
   (g) means to adjust the spacing of said second reading means with respect to said first reading means.

4. A phrase editing system according to claim 1, further comprising:
   (d) "double" selection means manually operative to provide a double control signal;
   (e) means responsive to said double selection means to provide a temporary acceleration to said means (a) to record on the tape; and
   (f) means responsive to said double selection means (d) to re-record the current phrase during the period of acceleration of the tape.

5. A phrase editing system according to claim 1, wherein said means (a) to record includes means to identify each phrase interval boundary with a phrase marker (delta), and in which said means (b) to record a selection marker (asterisk) comprises:
   "OK" selection means manually operative to provide an OK signal;
   single shot means connected to said OK selection means to provide a standard duration signal in response to the OK signal, the duration being calculated to extend over the next phrase interval boundary; and
   asterisk signal production means connected to said single shot means and responsive to the standard duration signal to record a selection control marker (asterisk) at the next phrase interval boundary.

6. A phrase editing system according to claim 1, wherein said means (a) to record includes first read-write means (w) to identify each phrase interval boundary with a phrase marker (delta) and wherein said means (c) to replace each selected phrase comprises:
   (d) edit control means operative to provide an "edit" signal and a rewind-type operation of the tape;
   (e) a repeat trigger;
   (f) second read-write means (X) for providing signals indicative of phrase boundary markers (delta) and of selection markers (asterisk);
   (g) logic means connected to said reading means (f) and responsive to the phrase boundary (delta) signal coincident to the selection marker (asterisk) signal to set said repeat trigger (e), and responsive to the phrase boundary (delta) signal unaccompanied by the selection marker (asterisk) signal to reset said repeat trigger (e); and,
   (h) means connected to said repeat trigger (e) and responsive to its set condition to record on the tape a duplicate of the phrase currently recorded in the next phrase interval of the tape.

7. A phrase editing system comprising:
   (a) tape movement means for passing the recording surface of a tape past a given point;
   (b) first read-write means (W head) associated with said tape movement means at the given point to be in scanning position relative to the recording surface of the tape;
   (c) means connected to said first read-write means to record on the tape during a forward pass a series of phrases;

(d) means connected to said first read-write means to record on the tape during the forward pass a series of phrase boundary markers (delta);

(e) means connected to said first read-write means to record on tape during the forward pass at selected phrase boundary positions a selection marker (asterisk);

(f) a "listen-talk" trigger settable to "listen" by a signal corresponding to a phrase boundary marker, resettable to "talk" by operation of a manual switch;

(g) audible sound producing means jointly responsive to the "listen" condition of said "listen-talk" trigger and said first read-write means to provide to the operator a master phrase;

(h) microphone means jointly responsive to the "talk" condition of said "listen-talk" trigger and said first read-write means to record a response to the master phrase within the same phrase interval;

(i) edit control means operative to provide an "edit" signal and a rewind-type operation of the tape;

(j) a repeat trigger;

(k) second read-write means (X) for providing signals indicative of phrase boundary markers (delta) and of selection markers (asterisk);

(l) logic means connected to said second read-write means (k) and responsive to the phrase boundary (delta) signal coincident to the selection marker (asterisk) signal to set said repeat trigger (j), and responsive to the phrase boundary (delta) signal unaccompanied by the selection marker (asterisk) signal to reset said repeat trigger (j); and (m) means connected to said repeat trigger (j) and responsive to its set condition to record on the tape a duplicate of the phrase currently recorded in the next phrase interval of the tape.

8. A phrase editing system according to claim 7 wherein said second read-write means (k) includes a second read-write head (X) selectively positionable with respect to said first read-write means (W) along the recording surface path of the tape, and said means (m) connected to said repeat trigger (j) is an AND circuit connecting said second read-write means to said first read-write means to write at said first read-write means the information currently readable at said second read-write means.

9. A phrase editing system according to claim 7 wherein said second read-write means (k) includes a variable-speed magnetic drum and a second read-write head (X) positioned for transducing signals to and from said drum, said first and second read-write heads being connected in such fashion that the drum stores for one phrase interval the formation currently readable at said first read-write means; and said means (m) connected to said repeat trigger (j) is an AND circuit connecting said second read-write means to said first read-write means to write at said first read-write means the information currently readable at said second read-write means.

10. In a tape recording system of the type in which a serial record is divided up by phrase interval boundary markers into a series of phrase intervals, during a major portion of which phrase intervals the normal operation is to have a master presentation followed by a response, control mechanism comprising:

(a) a "listen-talk" trigger settable to the listen state by a signal derived from a phrase boundary marker;

(b) audio means connected to said "listen-talk" trigger and responsive to its listen state to provide an audible signal corresponding to the master presentation; and (c) "talk" switch means manually operable to reset said "listen-talk" trigger (a) to the talk state upon operation subsequent to the termination of the setting signal derived from a phrase boundary marker.

11. In a tape recording system of the type in which a serial record is divided up by phrase interval boundary markers into a series of phrase intervals, control mechanism comprising:

(a) first reading means to provide audio outputs corresponding to phrase boundary markers recorded on the tape;

(b) second reading means to provide audio outputs corresponding to phrase boundary markers recorded on the tape, said second reading means normally providing output from a given phrase boundary marker a number of delay units later than the first reading means provides its output for the same boundary marker;

(c) means to cause audio distinctiveness between the audio outputs derived from a phrase boundary marker at said first and said second reading means; and (d) means to adjust the delay time of reading a given phrase marker by said first and said second reading means, whereby the operator may adjust the relative reading time of said second reading means with respect to said first reading means and thus adjust the phrase interval.

12. In a tape recording system of the type in which a serial record is divided up into phrase intervals, during a major portion of which phrase intervals the ordinary operation is to transduce on a main audio channel a master presentation followed by a response, control mechanism comprising:

(a) "double" selection means manually operative to provide a double control signal;

(b) means responsive to said double selection means to provide a temporary acceleration to the tape;

(c) recording means operative during ordinary operation to record each phrase and also to store each phrase for a phrase interval; and (d) means connected to said double selection means and to said recording means responsive to the double control signal, to rerecord the current phrase during the period of acceleration of the tape.

13. In a tape recording system of the type in which a serial record is divided up by phrase interval boundary markers into a series of phrase intervals, during a major portion of which phrase intervals the normal operation is to transduce on an audio channel a master presentation followed by a response, control mechanism comprising:

(a) OK selection means manually operative to provide a selection marker for a selected phrase, the selection marker being positioned on the tape coincident to a phrase interval boundary marker;

(b) edit control means operative to provide an "edit" signal and a rewind type operation of the tape;

(c) a repeat trigger;

(d) first and second read-write means for transducing signals corresponding to phrase interval boundary markers, selection markers and the content of the master presentation-response audio channel;

(e) logic means connnected to said second reading means (d) and responsive to reading the phrase boundary marker coincident to reading the selection marker to set said repeat trigger (c); and responsive to reading the phrase boundary marker unaccompanied by the selection marker to reset said repeat trigger (c); and (f) means connected to said repeat trigger and responsive to its set condition, connected also to said first and second read-write means (d) to record on the tape at said first read-write means a duplicate of the phrase currently recorded in the next phrase interval of the tape as provided by the second read-write means.

14. In a tape recording system of the type in which a serial record is divided up by phrase interval markers into a series of phrase intervals, during a major portion of which phrase intervals the normal operation is to have a master presentation followed by a response, the method comprising:
- (a) passing the tape forward over a read-write station to position at such station each phrase interval of tape in turn, each phrase interval boundary being marked with a phrase marking signal;
- (b) setting a binary "listen-talk" control device to "listen" upon receipt of the phrase marking signal, which provides to the responder the master audio presentation of the current phrase; and
- (c) providing for setting of the "listen-talk" device to "talk" by the operation of a "talk" key, such setting being momentary upon operation of the "talk" key, so that receipt of the phrase marking the start of the next phrase interval again gets the "listen-talk" device to "listen" regardless of whether or not the responder is still depressing the "talk" key, whereby the "talk" response is restrained from encroachment upon "listen" time for the subsequent master presentation.

15. In a tape recording system of the type in which a serial record is divided up into phrase intervals, during a major portion of which phrase intervals the ordinary operation is to transduce on a main audio channel a master presentation followed by a response, the method comprising:
- (a) passing a tape forward during ordinary operation over a read-write station to position at such station each phrase interval in turn;
- (b) maintaining a capability to reread the previously recorded phrase, by mechanism synchronized with tape movement;
- (c) temporarily accelerating the forward motion of the tape and reread mechanism; and
- (d) writing the phrase a second time on the tape during the temporary accleration by taking it from the reread mechanism.

16. In a tape recording system of the type in which a serial record is divided up into phrase intervals, identified by phrase interval boundary markers, during a major portion of which intervals the ordinary operation is to transduce on a main audio channel a master presentation followed by a response, the response including a selection marker indicating that a selected presentation is not to be repeated on any further pass of the tape, the editing method comprising:
- (a) passing the tape in reverse over a read-write station, to position in turn at such read-write station each phrase both selected and unselected;
- (b) maintaining a capability to reread the next adjacent unselected phrase;
- (c) detecting the selected nature of a phrase by examination of the selection marker-phrase interval boundary marker relationship; and
- (d) replacing the selected phrase with the next adjacent unselected phrase as taken from the reread capability.

References Cited by the Examiner
UNITED STATES PATENTS 3,156,052  11/1964  Irazoqui _____ 35—35.3

A. I. NEUSTADT, *Primary Examiner.*